United States Patent
Piestun

(10) Patent No.: US 9,967,541 B2
(45) Date of Patent: May 8, 2018

(54) 3D IMAGING, RANGING, AND/OR TRACKING USING ACTIVE ILLUMINATION AND POINT SPREAD FUNCTION ENGINEERING

(71) Applicant: The Regents of the University of Colorado, a body corporate, Denver, CO (US)

(72) Inventor: Rafael Piestun, Boulder, CO (US)

(73) Assignee: The Regents of the University of Colorado, a body Corporate, Denver, CO (US)

( * ) Notice: Subject to any disclaimer, the term of this patent is extended or adjusted under 35 U.S.C. 154(b) by 270 days.

(21) Appl. No.: 14/934,031

(22) Filed: Nov. 5, 2015

(65) Prior Publication Data
US 2016/0125610 A1 May 5, 2016

Related U.S. Application Data

(60) Provisional application No. 62/075,746, filed on Nov. 5, 2014.

(51) Int. Cl.
*H04N 13/00* (2018.01)
*H04N 13/02* (2006.01)

(52) U.S. Cl.
CPC ..... *H04N 13/0203* (2013.01); *H04N 13/0253* (2013.01); *G06T 2200/04* (2013.01)

(58) Field of Classification Search
CPC .................................................. H04N 13/0203
USPC ..................................................... 348/42–60
See application file for complete search history.

(56) References Cited

U.S. PATENT DOCUMENTS

| | | |
|---|---|---|
| 3,054,898 A | 9/1962 | Westover et al. |
| 3,597,083 A | 8/1971 | Fraser |
| 3,901,595 A | 8/1975 | Helava et al. |
| 3,961,851 A | 6/1976 | Gerharz |
| 4,178,090 A | 12/1979 | Marks et al. |
| 4,471,785 A | 9/1984 | Wilson et al. |
| 4,573,191 A | 2/1986 | Kidode et al. |
| 4,794,550 A | 12/1988 | Greivenkamp, Jr. |

(Continued)

FOREIGN PATENT DOCUMENTS

WO 2007116365 A2 10/2007

OTHER PUBLICATIONS

Chasles, F. et al., "Full-Field Optical Sectioning and Three-Dimensional Localization of Fluorescent Particles Using Focal Plane Modulation," Optics Letters, vol. 31, No. 9, May 1, 2006, 3 pgs.

(Continued)

*Primary Examiner* — Dave Czekaj
*Assistant Examiner* — Shanika Brumfield
(74) *Attorney, Agent, or Firm* — Maschoff Brennan

(57) ABSTRACT

Imaging systems and imaging methods are disclosed to estimate a three-dimensional position of an object at a scene and/or generate a three-dimensional image of the scene. The imaging system may include, for example, one or many light sources; an optical system configured to direct light from the one or more light sources into a pattern onto the scene; a mask; a detector array disposed to receive light from the scene through the mask; and at least one processor communicatively coupled with the detector and configured to estimate a depth of a particle within the scene.

20 Claims, 13 Drawing Sheets

(56) References Cited

U.S. PATENT DOCUMENTS

| | | | |
|---|---|---|---|
| 4,825,263 | A | 4/1989 | Desjardins et al. |
| 4,843,631 | A | 6/1989 | Steinpichier et al. |
| 5,076,687 | A | 12/1991 | Adelson |
| 5,102,223 | A | 4/1992 | Uesugi et al. |
| 5,193,124 | A | 3/1993 | Subbarao |
| 5,243,351 | A | 9/1993 | Rafanelli et al. |
| 5,337,181 | A | 8/1994 | Kelly |
| 5,521,695 | A | 5/1996 | Cathey, Jr. et al. |
| 5,701,185 | A | 12/1997 | Reiss et al. |
| 6,344,893 | B1 | 2/2002 | Mendlovic et al. |
| 6,969,003 | B2 | 11/2005 | Havens et al. |
| 7,342,717 | B1 | 3/2008 | Hausmann et al. |
| 7,604,981 | B1 | 10/2009 | Harris, Jr. et al. |
| 7,705,970 | B2 | 4/2010 | Piestun et al. |
| 8,620,065 | B2 | 12/2013 | Piestun et al. |
| 8,693,742 | B2 | 4/2014 | Piestun et al. |
| 2003/0035105 | A1 | 2/2003 | Quist et al. |
| 2003/0061035 | A1 | 3/2003 | Kadmbe |
| 2003/0096220 | A1 | 5/2003 | Lafferty et al. |
| 2004/0125373 | A1 | 7/2004 | Oldenbourg et al. |
| 2005/0057744 | A1 | 3/2005 | Pohle et al. |
| 2006/0126921 | A1 | 6/2006 | Shorte et al. |
| 2007/0121107 | A1 | 5/2007 | Tsai et al. |
| 2007/0268366 | A1 | 11/2007 | Raskar et al. |
| 2008/0137059 | A1* | 6/2008 | Piestun ............... G01C 3/08 356/4.01 |
| 2009/0206251 | A1 | 8/2009 | Hess et al. |
| 2009/0244090 | A1 | 10/2009 | Zhang et al. |
| 2010/0278400 | A1 | 11/2010 | Piestun et al. |
| 2011/0002530 | A1 | 1/2011 | Zhuang et al. |
| 2011/0249866 | A1 | 10/2011 | Piestun et al. |
| 2011/0310226 | A1* | 12/2011 | McEldowney .... G01B 11/2513 348/46 |
| 2012/0029829 | A1 | 2/2012 | Li et al. |
| 2012/0062708 | A1 | 3/2012 | Johnson et al. |
| 2012/0182558 | A1 | 7/2012 | Masumura |
| 2012/0273676 | A1 | 11/2012 | Kuijper |
| 2013/0102865 | A1 | 4/2013 | Mandelis et al. |
| 2013/0147925 | A1 | 6/2013 | Lew et al. |
| 2014/0078566 | A1* | 3/2014 | Rosen ............... G03H 1/0005 359/30 |
| 2014/0192166 | A1 | 7/2014 | Cogswell et al. |
| 2014/0226881 | A1 | 8/2014 | Piestun et al. |
| 2015/0035946 | A1 | 2/2015 | Piestun et al. |
| 2015/0192510 | A1 | 7/2015 | Piestun et al. |
| 2016/0048963 | A1 | 2/2016 | Piestun et al. |
| 2016/0125610 | A1 | 5/2016 | Piestun |
| 2016/0231553 | A1 | 8/2016 | Piestun et al. |

OTHER PUBLICATIONS

Dowski, Jr., Edward R. et al., "Single-Lens Single-Image Incoherent Passive-Ranging Systems," Applied Optics, vol. 33, No. 29, Oct. 10, 1994, 12 pgs.

Greengard, Adam et al., "Depth From Diffracted Rotation," Optics Letters, vol. 31, No. 2, Jan. 15, 2006, 3 pgs.

Greengard, Adam et al., "Depth From Rotating Point Spread Functions," Proceedings of SPIE, vol. 5557, 2004, 7 pgs.

Greengard, Adam et al., "Fisher Information of 3D Rotating Point Spread Functions," Computational Optical Sensing and Imaging Presentation, Jun. 6, 2005, 31 pages.

Johnson, Gregory E. et al., "Passive Ranging Through Wave-Front Coding: Information and Application," Applied Optics, vol. 39, No. 11, Apr. 10, 2000, 11 pgs.

Juette, "Three-dimensional sub-1 00 nm resolution fluorescence microscopy of thick samples," 2008, Nat Methods 5: 3 pgs.

Kao, H. Pin et al., "Tracking of Single Fluorescent Particles in Three Dimensions: Use of Cylindrical Optics to Encode Particle Position," Biophysical Journal, vol. 67, Sep. 1994, 10 pgs.

Pavani, et al., "Three-dimensional, single-molecule fluorescence imaging beyond the diffraction limit by using a double-helix point spread function", PNAS, Mar. 3, 2009, and online published, Feb. 11, 2009, 5 pgs.

Pavani et al., "Three dimensional tracking of fluorescent microparticles using a photon-limited double-helix response system", Optics Express, 2008, 10 pgs.

Pentland, Alex Paul, "A New Sense for Depth of Field," IEEE Transactions on Pattern Analysis and Machine Intelligence, vol. PAMI-9, No. 4, Jul. 1987, 9 pgs.

Piestun, Rafael et al., "Wave Fields in Three Dimensions: Analysis and Synthesis," J. Opt. Soc. Am. A., vol. 13, No. 9, Sep. 1996, 12 pgs.

Sirat, Gabriel Y., "Conoscopic Holography. I. Basic Principles and Physical Basis," J. Opt. Soc. Am. A, vol. 9, No. 1, Jan. 1992, 14 pgs.

Subbarao, Murali et al., "Analysis of Defocused Image Data for 3D Shape Recovery Using a Regularization Technique," SPIE, vol. 3204, 1997, 12 pgs.

Thomann et al., "Automatic fluorescent tag detection in 30 with super-resolution: application to analysis of chromosome movement", J. of Microscopy, 2002, 16 pgs.

GB Examination Report, dated Feb. 12, 2015, as received in Application No. 1422460.4.

GB Examination Report Search Report, dated Jul. 6, 2015, as received in Application No. 1422460.4.

International Search Report and Written Opinion dated Feb. 6, 2014 in related PCT Application No. PCT/US13/47379.

International Search Report and Written Opinion dated Jul. 22, 2014 as received in Application No. PCT/US2014/029391.

International Search Report and Opinion, dated Dec. 12, 2014 in PCT Application No. PCT/US2014/052756.

Vellekoop I.M., "Focusing coherent light through opaque strongly scattering media", Optics Letters, Aug. 15, 2007, vol. 32, No. 16.

Vellekoop I.M., "Demixing light paths inside disordered metamaterials", Optics Express, Jan. 7, 2008, vol. 16, No. 1.

X. Xu, "Time-reversed ultrasonically encoded optical focusing into scattering media", Nature Photonics 5, Jan. 16, 2011, 154-157.

K. Si., "Breaking the spatial resolution barrier via iterative sound-light interaction in deep tissue microscopy", Scientific Reports, Oct. 19, 2012.

Chaigne, T., "Controlling Light in Scattering Media Noninvasively Using the Photo-acoustic Transmission-matrix".

Conkey, D.B., "Genetic algorithm optimization for focusing through turbid media in noisy environments", Optics Express, Feb. 27, 2012, vol. 20, No. 5.

Conkey, D.B., "High-speed scattering medium characterization with application to focusing light through turbid media", Optics Express, Jan. 16, 2012, vol. 20, No. 2.

Yang, Xin, "Three-dimensional scanning microscopy through thin turbid media", Optics Express, Jan. 30, 2012, vol. 20, No. 3.

Popoff, S.M., "Measuring the Transmission Matrix in Optics: An Approach to the Study and Control of Light Propagation in Disordered Media", Physical Review Letters, Mar. 12, 2010, PRL 104, 100601.

Yaqoob, Z., "Optical phase conjugation for turbidity suppression in biological samples", Nat Photonics, Jun. 1, 2009.

Si, K., "Fluorescence imaging beyond the ballistic regime by ultrasound pulse guided digital phase conjugation", Nat Photonics, Oct. 1, 2012, 657-661.

Katz, O., "Focusing and compression of ultrashort pulses through scattering media", Nature Photonics 5, May 22, 2011, 372-377.

Judkewitz, B., "Speckle-scale focusing in the diffusive regime with time reversal of variance-encoded light", Nature Photonics, Mar. 17, 2013, 300-305.

Kong, F. "Photoacoustic-guided convergence of light through optically diffusive media", Opt. Lett. 36, 2053-5 (2011).

Aguet, Francois et al., "A Maximum-Likelihood Formalism for Sub-Resolution Axial Localization of Fluorescent Nanoparticles," Optics Express, vol. 13, No. 26, Dec. 26, 2005, 20 pgs.

International Search Report and Written Opinion dated Jan. 27, 2016 in PCT Application No. PCT/US2015/059331 (15 pages).

\* cited by examiner

3D IMAGING, RANGING, AND/OR TRACKING USING ACTIVE ILLUMINATION AND POINT SPREAD FUNCTION ENGINEERING

CROSS-REFERENCE TO RELATED APPLICATIONS

This application is a non-provisional of, and claims the benefit of, U.S. Provisional Patent Application Ser. No. 62/075,746, entitled "3D Imaging and Ranging Using Active Illumination and point spread function Engineering," filed Nov. 5, 2014, the entirety of which is incorporated in this document by reference for all purposes.

SUMMARY

An imaging system and an imaging method are disclosed to estimate a three-dimensional position of an object at a scene, track objects or portions of objects in three-dimensional space within a scene, and create three-dimensional images. The imaging system may include, for example, one or many light sources; an optical system configured to direct light from the one or more light sources into a pattern onto the scene; a mask; a detector array disposed to receive light from the scene through the mask; and at least one processor communicatively coupled with the detector and configured to estimate a depth of a particle within the scene based on the data collected by the detector array. In some embodiments, objects or portions of objects can be tracked in three-dimensional space within the scene based on the data collected by the detector array. In some embodiments, three-dimensional images may be created of the scene based on the data collected by the detector array.

In some embodiments, the optical system comprises an active illumination system. In some embodiments, the pattern includes a pattern selected from the list consisting of a spot array pattern, a striped pattern, a sinusoidal pattern, and a speckle pattern. In some embodiments the pattern may include a three dimensional pattern or a pattern that various in three dimensions.

In some embodiments, the mask generates a point spread function from the light from the scene. In some embodiments, the point spread function comprises a double helix point spread function. In some embodiments, the imaging system may implement a point spread function that includes one or more spots of light that describe curves in three-dimensional space.

In some embodiments, the mask includes an optical element such as, for example, a diffractive optical element, a grating, a Dammann grating, a diffuser, a phase mask, a hologram, an amplitude mask, a spatial light modulator, and/or a prism array.

Some embodiments may include a method for estimating a depth of objects (or particles or portions of the objects). The method may include illuminating a scene with light having a first pattern; directing light from the scene through a mask that generates a point spread function from the light from the scene that varies based on depth within the scene; producing an image of the scene from light that passes through the mask using a light detector; and estimating a depth of one or more objects within the scene from the image of the scene.

Some embodiments may include a method for estimating a depth of objects (or particles or portions of the objects). The method may include illuminating a scene with a first light pattern; producing a first image of the scene after it passes through the mask using a light detector; illuminating the scene with a second light pattern; producing a second image of the scene after it passes through the mask using the light detector; and estimating a depth of one or more objects within the scene from the first image of the second and the second image of the scene.

In some embodiments, the method may also include directing light from the scene through a mask that generates a point spread function from the light from the scene that varies based on depth within the scene.

In some embodiments, the method may also include directing light from the scene through a first mask that generates a first point spread function from the light from the scene that varies based on depth within the scene; and directing light from the scene through a second mask that generates a second point spread function from the light from the scene that varies based on depth within the scene.

In some embodiments, the first point spread function comprises a double helix point spread function or a cubic phase point spread function. In some embodiments, the first point spread function may include one or more spots of light that describe curves in three-dimensional space. In some embodiments, the first point spread function may have an extended depth of field.

In some embodiments, the first pattern includes a pattern selected from the list consisting of a spot array pattern, a striped pattern, a sinusoidal pattern, and a speckle pattern; and wherein the second pattern includes a pattern selected from the list consisting of a spot array pattern, a striped pattern, a sinusoidal pattern, and a speckle pattern.

In some embodiments, the first mask includes an optical element selected from the list consisting of an optical element with an extended depth of field, a cubic phase mask, a double helix point spread function mask, diffractive optical element, a grating, a Dammann grating, a diffuser, a phase mask, a hologram, an amplitude mask, a spatial light modulator, and a prism array; and/or the second mask includes an optical element selected from the list consisting of a cubic phase mask, a double helix point spread function mask, diffractive optical element, a grating, a Dammann grating, a diffuser, a phase mask, a hologram, an amplitude mask, a spatial light modulator, and a prism array.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

These and other features, aspects, and advantages of the present disclosure are better understood when the following Detailed Description is read with reference to the accompanying drawings.

DETAILED DESCRIPTION

Systems and methods are disclosed for estimating the three-dimensional position and/or the range of a particle(s), object(s), or portion of an object in a scene. Some embodiments may include an active illumination system that is used to illuminate the scene. Some embodiments may illuminate the scene with an illumination pattern. Some embodiments may employ one or more masks (or phase masks) that produce a point spread function that includes depth of field information.

Figure 1:
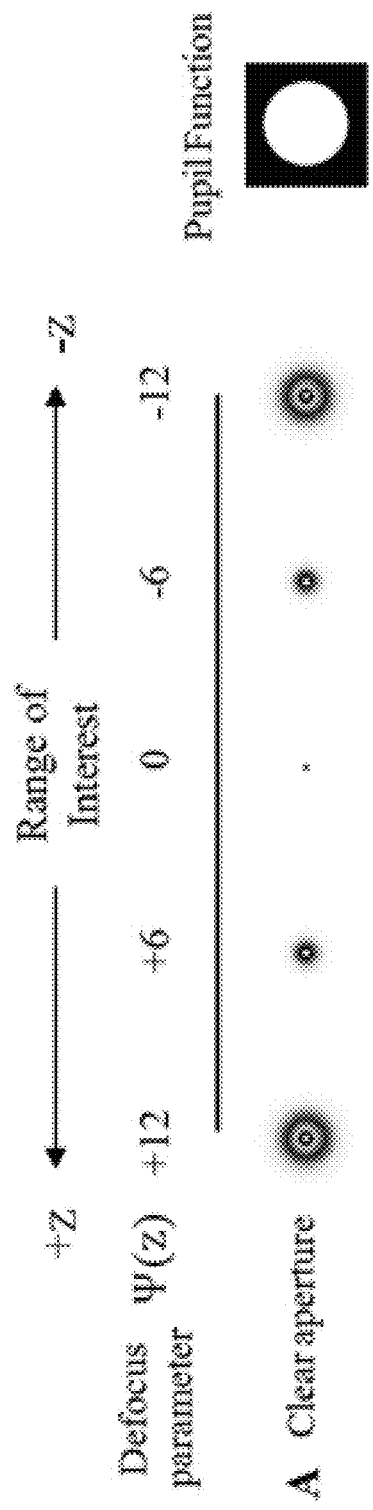
FIG. 1 illustrates a defocus response of a conventional (e.g., a clear aperture) optical imaging system according to some embodiments.

Some passive ranging systems retrieve depth of a scene from images of defocus. Often the result of defocus can be an enlarged, rotationally-symmetric, transverse pattern that is consistent with the out-of-focus blurring of objects that may carry limited high spatial frequency information. Depth from defocus approaches may be attractive for ranging applications because they can provide range over a wide field of view, with parallel transverse data in contrast to a point-by-point scanning-based technique. The depth information may be contained in a depth-dependent blur encoded into the image. In many cases this blur may be ambiguous, for example, more than one depth may produce the same image as shown in FIG. 1, which illustrates a defocus response of a conventional (e.g., a clear aperture) optical imaging system according to some embodiments.

Depth-from-defocus systems may adjust focus or use several (e.g., typically two) fixed focal planes. In some cases, depth estimation may be provided by the radius of the blur as shown in FIG. 1.

Engineered coded pupil functions may be used to modify a point spread function for enhanced (in depth, transverse and/or global) sensitivity. Some of these techniques may operate under passive and polychromatic illumination.

The Double-Helix point spread function (DH-PSF) may provide an attractive solution for 3D localization. General DH-PSF may be superpositions of Laguerre-Gauss (LG) modes. For example, for any point spread function type, optical efficiency, estimation precision, depth of field, side lobes, and/or other parameters affected by the pupil-plane phase modulation can be optimized or just improved according to a task specific metric such as Fisher information or the Cramer-Rao Lower Bound (CRLB).

Figure 2:
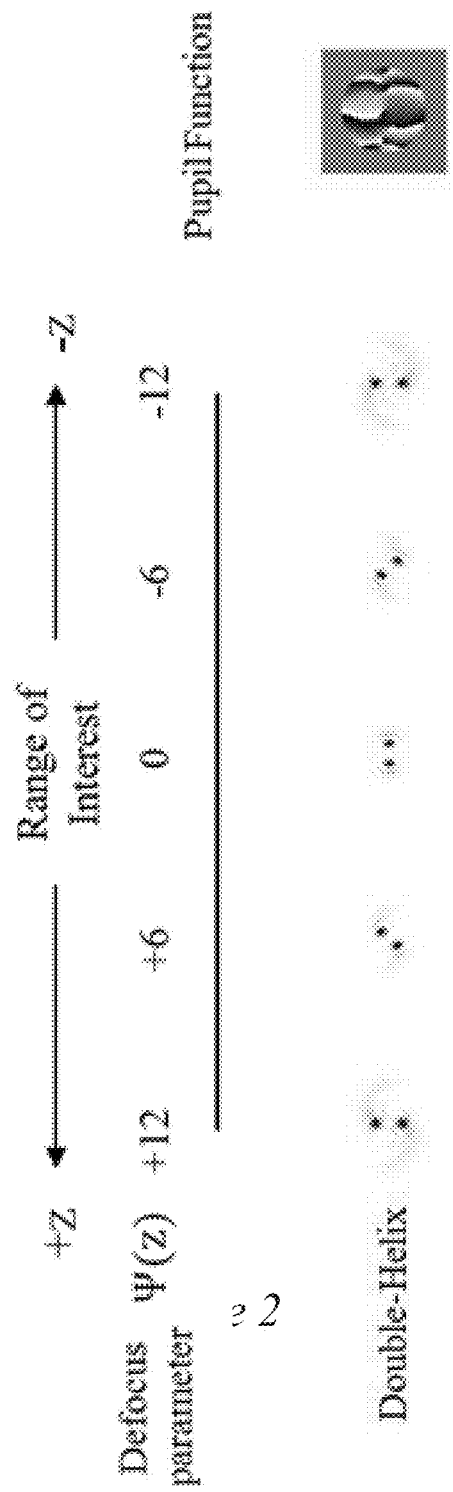
FIG. 2 illustrates an example of the depth dependence of the DH-PSF with the defocus parameter according to some embodiments.

For example, a specific design of the DH-PSF may be more suitable for range estimation than clear aperture systems based on the enhanced precision in localization of point-like objects. The DH-PSF encodes the axial position of an object in the orientation of two replicas of the object in the image (as opposed to encoding with blur). If the object is a point source, the images form a double-helix pattern as the object is moved through focus as shown in FIG. 2, which illustrates an example of the depth dependence of the DH-PSF with the defocus parameter.

Figure 3:
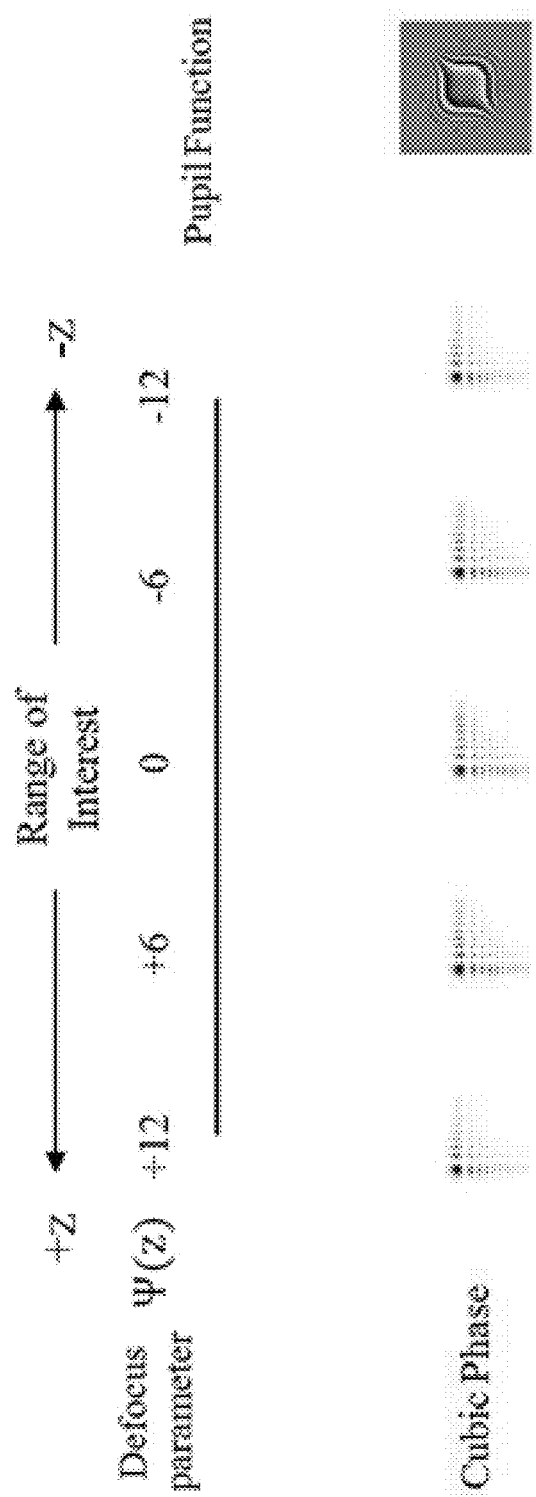
FIG. 3 illustrates an example of axial dependence of a point spread function generated by a cubic phase mask according to some embodiments.

Point spread functions may, for example, have limited axial variation. In some cases the point spread function generated by a phase mask (e.g., a cubic phase mask) may produce a point spread function with an essentially constant profile over an extended depth, as shown in FIG. 3, which shows an example of axial dependence of a point spread function generated by a cubic phase mask, which is one example of depth invariant point spread function. There may be many (possibly infinite) possibilities when it comes to generate depth invariant point spread functions. Examples may include point spread functions with Bessel beams, axicons, so called accelerating beams, numerically optimized point spread functions, combinations of Bessel beams, Mathiew beams, Laguerre Gaussian beams, Gaussian-Bessel beams, and/or many others. In some embodiments, the point spread function may include an optical element with an extended depth of field.

In some embodiments, the phase mask may include an amplitude mask, a hologram, or a diffractive optical element. In some embodiments, the phase mask may include a double-helix phase mask, a polarization insensitive phase mask, a polarization dependent response for each spatial location (pixel), an elliptically apertured phase mask, etc. In some embodiments, the phase mask function can be implemented with a reflective device, such as a structured mirror, with a surface profile or varying reflectivity. The phase mask can also be implemented with transmissive or reflective spatial light modulators, continuous or segmented, including possibly liquid crystal devices.

In some embodiments, depth estimation may be determined using two or more engineered phase masks, broadband incoherent light, and/or reconstruction of depth maps for continuous scenes with varying depth.

Figure 4:
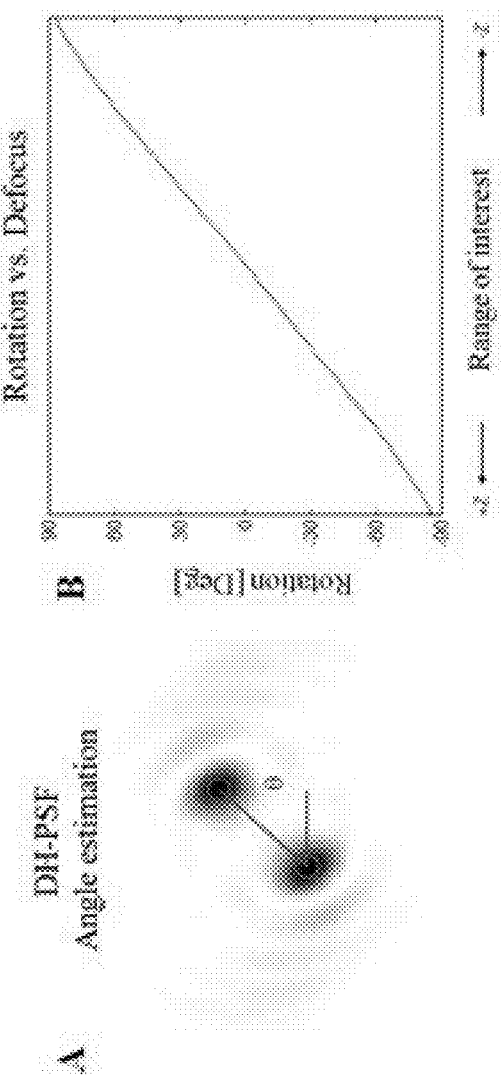
FIGS. 4A and 4B illustrate example configurations of a point spread function according to some embodiments.

FIGS. 4A and 4B illustrate example configurations of a point spread function according to some embodiments.

Figure 10:
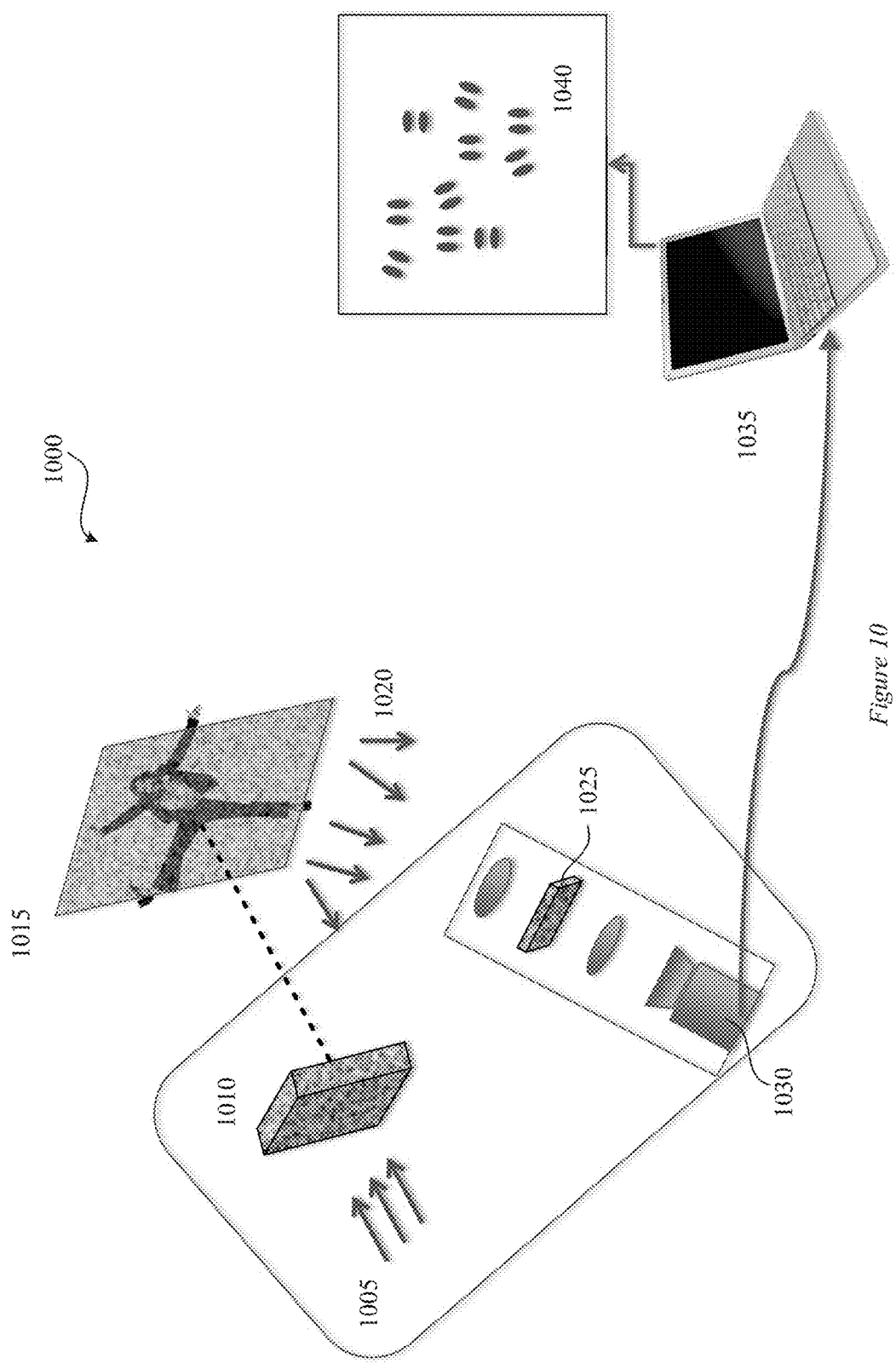
FIG. 10 illustrates an active illumination system according to some embodiments.

FIG. 10 illustrates an example configuration of active illumination, point spread function coded, 3D imaging and/or ranging system according to some embodiments of the invention. In a DH-PSF or other helical point spread functions a rotation angle may be associated with the estimated point spread function by calculating the angle subtended by the centroids of each lobe and a frame-of-reference on the detector as shown in FIG. 10. The DH-PSF rotation angle varies accordingly as a function of axial position as shown in FIG. 10 and can be found experimentally to account for the presence of possible aberrations. For example, the DH-PSF may manifest as a pair of intensity lobes that rotate as the object moves axially or the angle of rotation or the intensity lobes may be based on the axial position of the object. Alternatively or additionally, the point spread function may manifest as a pair of intensity lobes that separate as the object moves axially. In some embodiment, the size of the point spread function as a function of depth encodes depth information. In some embodiments, the changing shape of the point spread function with depth provides the depth information.

In some embodiments, the term "scene" may include a collection of objects at which the 3D imaging system is aimed with the intention of imaging and/or measuring. In a biological application, for example, the scene may be a sample, which could be prepared with different fluorophores, to express different structural or functional aspects of the sample. In materials inspection and metrology, as another example, the scene could be a semiconductor, metal, dielectric, etc., at which the system is aimed. In photography, as yet another example, the scene may be a collection of objects that can include humans of which the system (or camera) is intended to locate, recognize, and/or analyze their gestures and/or actions of the human and/or portions of the human by means of 3D imagery or ranging measurements. The scene may include the motion and/or position of the extremities of a human. In 3D printing applications, as yet another example, the scene can be an object that is scanned for reproduction with additive manufacturing.

In some embodiments, the phrase "active illumination system" may refer to an illumination system that delivers light to the scene in a way that facilitates 3D information retrieval. The illumination of the scene may include the use of optics that encodes information.

Figure 5:
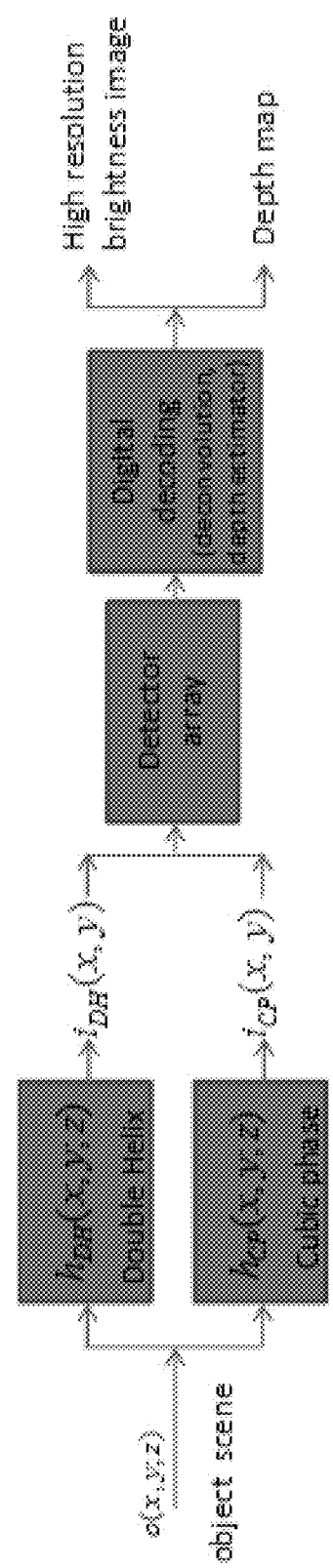
FIG. 5 illustrates a block diagram of an active dual-channel complementary point spread function-engineering digital-optical system according to some embodiments.

In some embodiments, the light illumination system may include a highly coherent source that impinges onto a diffractive optical element and/or projects an array of spots onto the scene as shown in FIG. 5. In some embodiments, the array of spots may have a periodic, random, dynamic, scanning spots, a sparse set of spots, and/or pseudo-random pattern in a transverse plane and/or in 3D within a volume. Furthermore, for example, by modulating or changing the diffractive optical element and/or the source, the array of spots can be modulated in intensity over time or shifted in location. In some embodiments, the array of spots may effectively produce a parallel scanning system consisting of a multitude of spots in space. The diffractive optical element can be substituted by a refractive optical element, a reflective element, lenslet array, a hologram, a spatial light modulator, an amplitude mask, an imaging system, and/or a Dammann grating, etc.

In some embodiments, the illumination system may create a speckle pattern on the scene. The speckle pattern, for example, may have various statistical characteristics and be either static or dynamic.

In some embodiments, an active illumination system may generate patterns composed of lines, curves, spots, surfaces, 3D patterns, and/or arbitrary 3D patterns. For example, the active illumination system may generate an array of spots that extend in depth as an array of Bessel-like beams. As another example, the active illumination system may generate patters composed of so-called non-diffracting beams generated by axicons containing conical surfaces or other surfaces of revolution. As another example, the illumination system may include a cubic phase mask that produces curved lines in 3D space. As another example, the illumination system may include a cubic phase mask that includes so-called accelerating beams. As another example, the illumination system may include a grating such as, for example, a Dammann grating, etc., that generates an array of lines and/or modulated lines. In some embodiments, the illumination system may generate plane waves such as, for example, with oblique incidence and/or superposition of plane waves.

As another example, the active illumination system may produce a light pattern that is modulated and/or changed in time. As another example, the active illumination system may produce a light pattern that may include patterns of different colors and/or spectral characteristics. In some embodiments, the time of arrival of light modulated in time can be used as an additional source of depth information.

In some embodiments the active illumination system may produce a light pattern that includes a single (or several) spots that may be scanned across the scene in two or three dimensions. In some embodiments, images of the scene may be processed to retrieve 3D information based on light reflected (or emitted) from one or more particles or objects within the scene. In some embodiments, the information in these images can be used to construct a cross section of the scene and/or to refocus these cross-sections.

In some embodiments, the active illumination system may encode information in a coherence function or the polarization of the illumination patterns or structures.

In some embodiments, the active illumination system may include lenses to focus, magnify or demagnify the light patterns and/or light structures.

Figure 6:
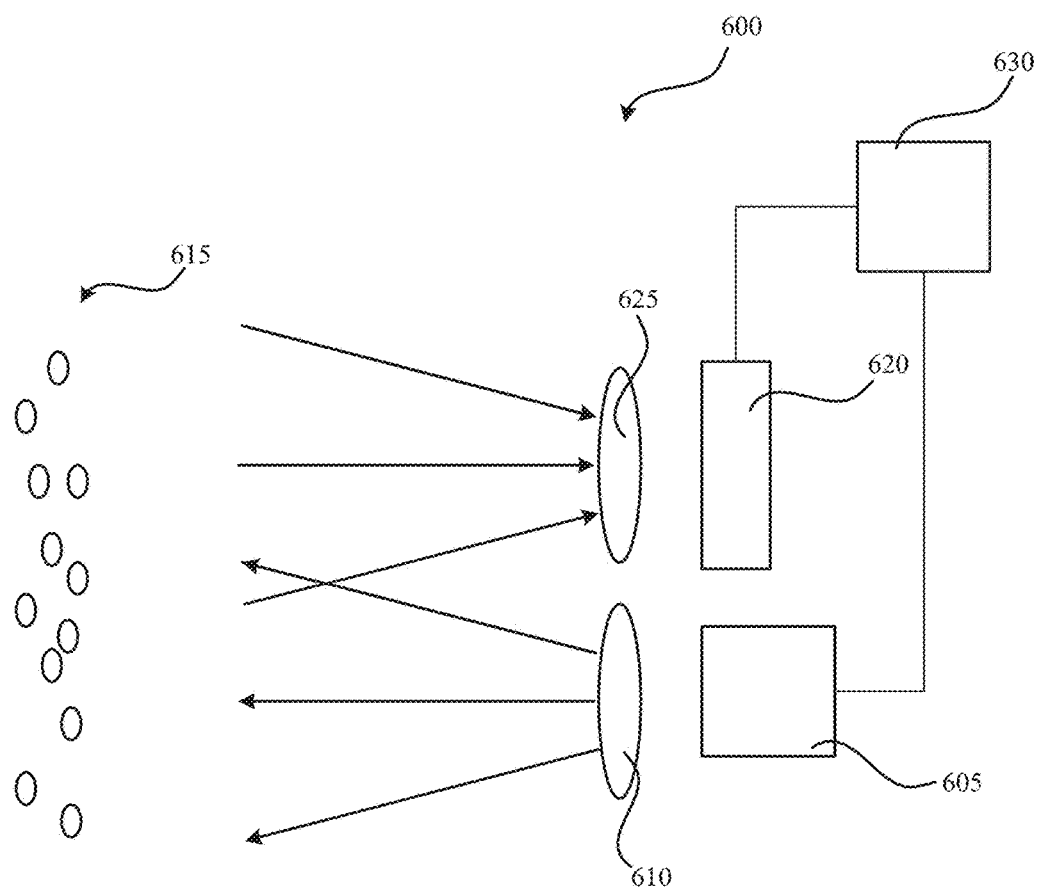
FIG. 6 illustrates an imaging and ranging system according to some embodiments.

Embodiments of the invention include an imaging and ranging system 600 shown in FIG. 6. The system 600 includes one or more light sources 605 and an optical system 610 that projects light patterns onto a scene 615. The combination of the light sources 605 and/or the optical system 610 may comprise an active illumination system.

The optical system 610 may include one or more phase masks, lenses, diffractive optical elements, gratings, Dammann gratings, diffusers, phase masks, holograms, amplitude masks, spatial light modulators, prism arrays, etc. In some embodiments, the optical system 610 may create one or more illumination patterns as shown in FIGS. 9A-9G.

The system 600 may also include a detector 620 that collects light from the scene 615 through a phase mask 625 and/or other optical elements. The system 600 may also include at least one controller 630 that may be used to determine depth information of various portions of the scene based on inputs from the detector 620, control the operation of the light sources 605 and/or control the operation of the detector 620.

In some embodiments, the light source 605 may include a plurality of light sources. In some embodiments, the light source 605 may also include a light emitting diode (LED), a super-luminescent LED, a laser, a white light source, a natural light, a pulsed laser, etc. In some embodiments, the light source 605 may project infrared light and/or visible light.

In some embodiments, the optical system 610 may project light from the light source 605 into light patterns onto the scene 615. In some embodiments, the optical system 610 may modulate the light from the light source 605 and/or direct the light from the light source to the scene 615. The optical system 610 may include any number of optical elements such as, for example, one or more diffractive optical elements, gratings, Dammann gratings, diffusers, phase masks, holograms, amplitude masks, spatial light modulators, or prism arrays. In some embodiments, the light from the light source 605 may be modulated by a spatial light modulator (SLM).

In some embodiments, the optical system 610 may project light patterns onto the scene 615 that change or evolve with depth.

In some embodiments, the optical system 610 may project light patterns onto the scene 615 that encodes information in two-dimensions or three dimensions with spatial variations, temporal variations, a coherence function, polarization, and/or the spectral characteristics of the light, etc. In some embodiments, the optical system 610 may create a multiplicity of light beams that illuminate at least a portion of the objects in the scene.

In some embodiments, the detector 620 may be a CCD camera, a CMOS camera, a photodetector, an avalanche photodetector, etc. In some embodiments, the light reaching the detector 620 may be the result of scattering, transmission, absorption, fluorescence, two/multi-photon fluorescence, high harmonic generation, refraction, and/or diffraction at or from the objects of the scene 615. In some embodiments, the light from the scene 615 may pass through one or more optical elements prior to being collected at the detector 620.

In some embodiments, the detector 620 may provide an image of at least one object or portions of the object in the scene 615. In some embodiments, the detector 620 may incorporate redundant features of an object or objects within the scene 615 at offset positions and/or at lateral shifts. In some embodiments, the processor may determine the depth of the object or objects based on the offset of the redundant features.

In some embodiments, a phase mask 625 may be positioned in the optical path between the scene 615 and the detector 620. In some embodiments, the phase mask 625 may generate a three-dimensional point spread functions. In some embodiments, the phase mask 625 may include any number of optical elements such as, for example, one or more diffractive optical elements, gratings, Dammann gratings, diffusers, phase masks, holograms, amplitude masks, spatial light modulators, and/or prism arrays, etc. In some embodiments, the phase mask 625 may be implemented by a reflective element such as, for example, a deformable mirror, a reflective spatial light modulator, etc.

In some embodiments, the phase mask 625 may be transmissive or reflective. In some embodiments, the phase mask 625 may modulate the intensity of light by scattering or absorption of light. In some embodiments, the phase mask 625 may produce an image of a small object (or point source) that changes with the 3D position of the small object. In some embodiments, the phase mask 625 may generate, for each point of light in the scene 615, one or more spots on the detector 620.

In some embodiments, the phase mask 625 may optimize a depth specific metric, such as maximizing or increasing the Fisher information with respect to depth estimation, or minimizing the Cramer Rao lower bound, or mutual information.

In some embodiments, the phase mask 625 may be a transmissive phase mask or a reflective phase mask.

In some embodiments, the controller 630 may include a processor, microprocessor, computer system, etc. For example, the controller 630 may include the computer system 700 shown in FIG. 7. In some embodiments, the controller 630 may determine the depth of at least one or more objects of the scene 615 based on the image shape of a spot of light from one or more objects in the scene 615. In some embodiments, the controller 630 may determine the depth of at least one or more objects of the scene 615 based on the locations of the one or many spots on the image generated by a spot of light from the one or more objects in the scene 615.

In some embodiments, the overall point spread function of the system may a combination of the point spread functions of the illumination subsystem, the optical subsystem between the scene and the detector, and the reconstruction algorithm. One example of a way for determining the location of an object is by the variations of the shape of the point spread function with location in depth of the object (e.g., the image generated by the object will be a function of the location in depth). Another example of a way for an determining the location (or three-dimensional position) of an object is by directly illuminating a certain region and then imaging a whole volume. In this example, only the object or portion of the object in the region defined by the illumination may generate an image and hence the location (or three-dimensional position) of the object or portion of the object will be determined by the region of illumination. As another example, the scene may be illuminated with a spot pattern that includes an array of isolated spots. The location (or three-dimensional position) of an object or portion of the object in the scene illuminated by the spots may be determined. A processor or controller (e.g., controller 630, processor 825, or processor 1035) for example, may estimate the location (or three-dimensional position) of the object may be made from the images acquired by the detector(s).

In some embodiments, at least two images of the scene 615 may be obtained by the controller 630 via the detector 620 at the same or substantially the same time. In other embodiments, at least two images of the scene 615 may be obtained by the controller 630 via the detector at different times.

In some embodiments, the scene 615 may include at least a portion of or all of a human. In such embodiments, the optical system 610 may illuminate the human within the scene 615 and the detector 620 may capture an image of the human within the scene 615, which may be recorded by the controller 630.

In some embodiments, multiple images of a human within the scene 615 may be captured by the detector 620 and recorded by the controller 630. The controller 630 may track the motion of the human and/or portions of the human based on the multiple images of the human and/or other information provided by the system 600 or from other sources. In some embodiments, the controller 630 may provide tracking information and/or three-dimension information of the human and/or portions of the human to control and/or update a user interface such as, for example, a display, speaker, handheld device, etc.

In some embodiments, multiple images of an object or objects within the scene 615 may be captured by the detector 620 and recorded or saved into a memory location by the controller 630. The controller 630 may track the motion of the object or objects based on the multiple images of the human and/or other information provided by the system 600 or from other sources. For example, the location of the object or a portion of the object may be tracked by following the object as it moves within the scene over time. For example, the location of the object or a portion of the object may be determined periodically and saved into memory. In some embodiments, the controller 630 may provide tracking information and/or three-dimension information of the object or objects to control and/or update a user interface such as, for example, a display, speaker, handheld device, etc.

In some embodiments, the system 600 may be a part of a three-dimensional camera or a microscope. In some embodiments, the system 600 may be a part of a ranging system.

In some embodiments, the scene 615 may include brain tissue comprising neurons. In some embodiments, the controller 630 may use 3D information to track the signals produced by neurons. In some embodiments, the optical system 610 may project one or more light patterns on at least one neuron.

In some embodiments, at least a portion of the scene may include a surface of material. The three-dimensional characteristics of the surface may be measured and/or analyzed by the controller 630 based on at least one image captured by the detector.

In some embodiments, at least a portion of the scene may include a portion of a production line. Three-dimensional images of objects on the production line may be captured by the detector 620 and/or analyzed by the controller 630.

In some embodiments, the system 600 may be used as part of a robot. The controller 630 may provide three-dimensional information and/or tracking information to the robot based on images of the scene 615 that are captured by the detector 620. For example, the system 600 may capture portions of a space to be navigated. The controller 630 may communicate information to the robot or be used by the robot to navigate the space such as, for example, by engaging and/or controlling, motors, actuators, pulleys, etc. in response to the information.

In some embodiments, the system 600 may be used as part of a manned or unmanned vehicle. The controller 630 may provide three-dimensional information and/or tracking information to the vehicle based on images of the scene 615 that are captured by the detector 620. For example, the system 600 may capture portions of a space to be navigated. The controller 630 may communicate information to the vehicle or be used by the vehicle to navigate the space such as, for example, by engaging and/or controlling, motors, actuators, pulleys, etc. in response to the information.

In some embodiments, the system 600 may be used as part of a mobile device, a wearable device, and/or a surveillance system. In some embodiments, the system 600 may be used as or as part of a 3D scanner or a 3D printer. In some embodiments, the system 600 may be used as part of an optical tweezers system.

In some embodiments, the phase mask 625 may generate a spatial light modulator. In some embodiments, the phase mask 625 may be implemented by a reflective element such as, for example, a deformable mirror, a reflective spatial light modulator, etc.

In some embodiments, the phase mask 625 may generate a double-helix point spread function phase-mask. In some embodiments, the Fourier transform of the sample image can be multiplied by the double-helix point spread function transfer function. In some embodiments, every object point in the scene may be convolved with two lobes such that the angular orientation of the two lobes may vary depending on the axial location of the object above or below focus. For example, the two lobes may be aligned horizontally when the emitter (or object) is in focus. As the emitter is moved towards the objective, the double-helix point spread function lobes may rotate in the counterclockwise direction. On the other hand, if the emitter is moved away from the objective, the lobes may rotate in the clockwise direction.

Alternatively or additionally, as the emitter is moved towards the objective, the double-helix point spread function lobes may rotate in the clockwise direction. On the other hand, if the emitter is moved away from the objective, the lobes may rotate in the counterclockwise direction.

Alternatively or additionally, the phase mask 625 may generate a lateral point spread function that cause the lobes in an image to be displaced horizontally depending on the axial location of the emitter. For example, the two lobes may be aligned vertically when the emitter (or object) is in focus.

As the emitter is moved towards the objective, a first lobe may move to the left and a second lobe may move to the right. On the other hand, if the emitter is moved away from the objective, the first lobe may move to the right and the second lobe may move to the left.

In some embodiments, the phase mask 625 may generate a point spread function that produces a transverse profile composed of multiple patterns. Each of these patterns may retain its fundamental shape with defocus yet each pattern may move in different trajectories during defocus. In some embodiments, phase mask 625 may include a point spread function that may include one or more spots of light that describe curves in three-dimensional space. In some embodiments, phase mask 625 may include a point spread function that may have an extended depth of field.

In some embodiments, the phase mask 625 may generate a point spread function that produces two image lobes that are separated from each other along a straight line. The two lobes may be separated from each other (e.g., the line may extend or contract) based on the defocus of the emitters. For example, the two lobes may be separated from each other in the opposite direction.

In some embodiments, the phase mask 625 may generate a point spread function that may produce two lobes that move along two different straight lines as the emitter moves relative to the objective lens from a positive defocus position to a negative defocus position and vice versa. In some embodiments, the two straight lines may be parallel to each other.

In some embodiments, the phase mask 625 may generate a point spread function that may have at least one helix with infinite offset radius that degenerates into a straight line. In some embodiments, the point spread function may have two straight lines with an axis of symmetry coinciding with the optical axis of the system. In some embodiments, the point spread function may have at least a helix with null (zero) pitch such that the helix degenerates into a circle or an ellipse. In some embodiments, the point spread function may generate a conical surface in three-dimensional space. In some embodiments, the point spread function may have at least one helix degenerating into a conical section curve.

In some embodiments, a maximum of a point spread function may describe a curve in three-dimensional space that turns around an axis at a constant or continuously varying distance (offset) while moving in the direction parallel to the axis. In some embodiments, a maximum of the point spread function describes a curve in three-dimensional space similar to a helix with varying offset from a helix axis and/or a pitch, and when both the axis and offset are constant, the point spread function describes a helical curve.

Figure 7:
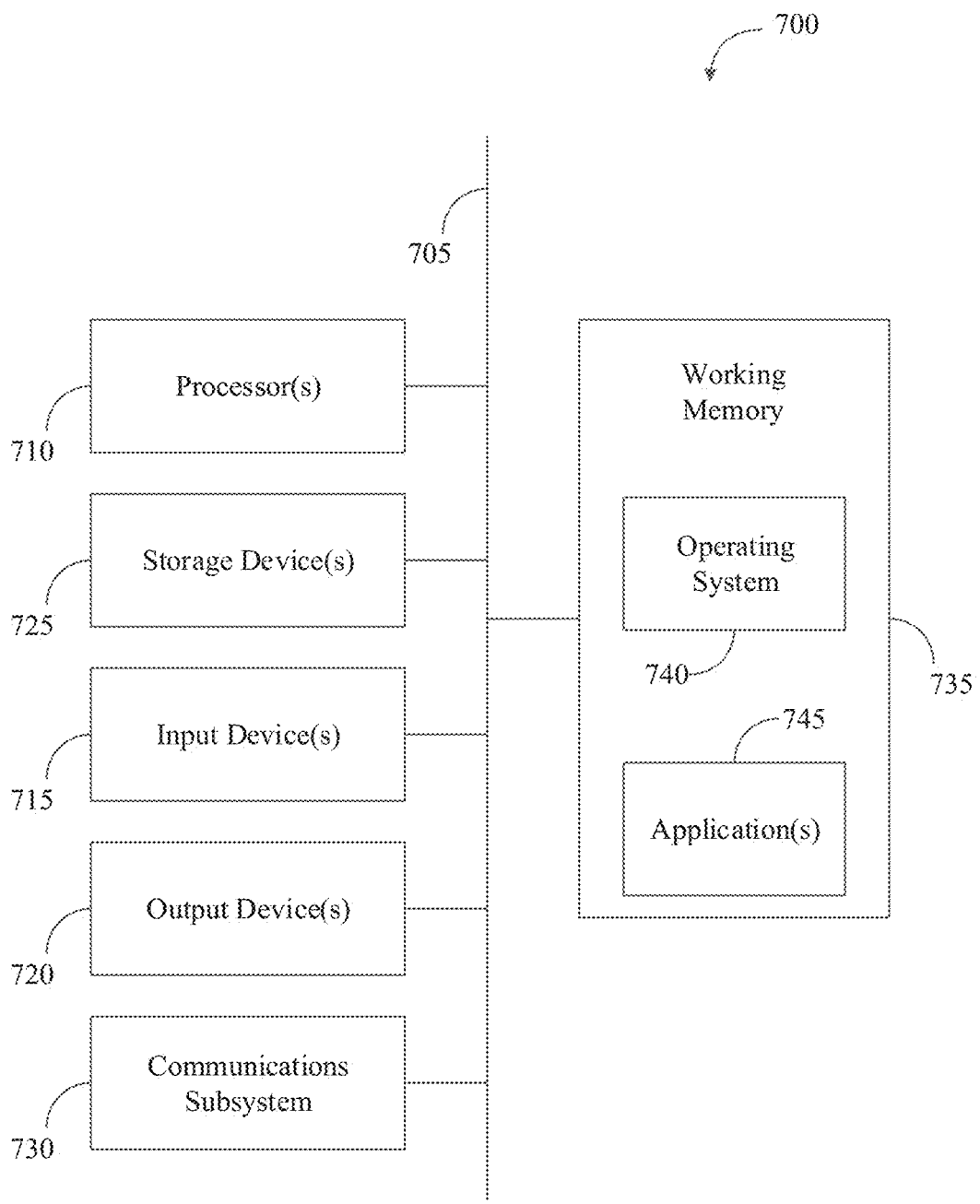
FIG. 7 shows an illustrative computational system for performing functionality to facilitate implementation of embodiments described in this document.

The computational system 700 (or processing unit) illustrated in FIG. 7 can be used to perform any of the embodiments of the invention. For example, the computational system 700 can be used alone or in conjunction with other components. As another example, the computational system 700 can be used to perform any calculation, solve any equation, perform any identification, and/or make any determination described here. The computational system 700 includes hardware elements that can be electrically coupled via a bus 705 (or may otherwise be in communication, as appropriate). The hardware elements can include one or more processors 710, including, without limitation, one or more general-purpose processors and/or one or more special-purpose processors (such as digital signal processing chips, graphics acceleration chips, and/or the like); one or more input devices 715, which can include, without limitation, a mouse, a keyboard, and/or the like; and one or more output devices 720, which can include, without limitation, a display device, a printer, and/or the like.

The computational system 700 may further include (and/or be in communication with) one or more storage devices 725, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 700 might also include a communications subsystem 730, which can include, without limitation, a modem, a network card (wireless or wired), an infrared communication device, a wireless communication device, and/or chipset (such as a Bluetooth® device, a 802.6 device, a Wi-Fi device, a WiMAX device, cellular communication facilities, etc.), and/or the like. The communications subsystem 730 may permit data to be exchanged with a network (such as the network described below, to name one example) and/or any other devices described in this document. In many embodiments, the computational system 700 will further include a working memory 735, which can include a RAM or ROM device, as described above.

The computational system 700 also can include software elements, shown as being currently located within the working memory 735, including an operating system 740 and/or other code, such as one or more application programs 745, which may include computer programs of the invention, and/or may be designed to implement methods of the invention and/or configure systems of the invention, as described in this document. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 725 described above.

In some cases, the storage medium might be incorporated within the computational system 700 or in communication with the computational system 700. In other embodiments, the storage medium might be separate from the computational system 700 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 700 and/or might take the form of source and/or installable code, which, upon compilation and/or installation on the computational system 700 (e.g., using any of a variety of generally available compilers, installation programs, compression/decompression utilities, etc.), then takes the form of executable code.

Some embodiments may include the simultaneous engineering of an illumination pattern and/or a point spread function of an imaging system to recover depth information of a scene and/or object brightness/reflectivity/fluorescence to characterize the scene. The system performance limits may be used to design the illumination and/or imaging parts of the system jointly or separately. The Performance limits such as the Cramer-Rao Bound may also help compare with other methods such as the standard clear circular aperture used in depth from defocus methods.

In some embodiments, it may be possible to use diverse and/or complementary illuminations and/or engineered point spread functions to extract information from the scene that is normally lost with classical imaging systems. For instance, the DH-PSF may provide high depth discrimination over an extended depth range, while an axicon or a cubic phase mask may provide in-focus information for similar depth of field. A spot array (random or lattice) may be used to facilitate the decoding of the depth information on a point by point basis and/or on a wide field of view. The spot array may be modified over time to recover depth from different regions of interest or from the whole scene. These capabilities may be complementary and/or amenable for joint design and joint digital post-processing. The basic property of interest in the DH-PSF and other point spread functions used on the passive side of the system is its rapid change through defocus that improves the sensitivity to depth and facilitates its estimation. The use of efficient phase masks for both the spot array generation and the passive point spread function engineering enables high light throughput, which is critical for low power consumption situations.

The systems and methods presented here may be amenable to multi-aperture parallel implementation in arrangements similar to light field cameras.

In some embodiments, as opposed to stereo imaging, the illumination and/or point spread function engineering solution may not experience correspondence and occlusion problems. Therefore, the systems are attractive for many 3D applications such as 3D scanners, surface profilometry, neuronal imaging, fluorescence microscopy, interactive games, surveillance, robotics, and mobile applications.

The systems may be amenable to time sequential imaging performed with complementary illuminations and point spread functions implemented in parallel with a dual aperture system or via a beam splitter device with either one or more cameras.

Figure 8:
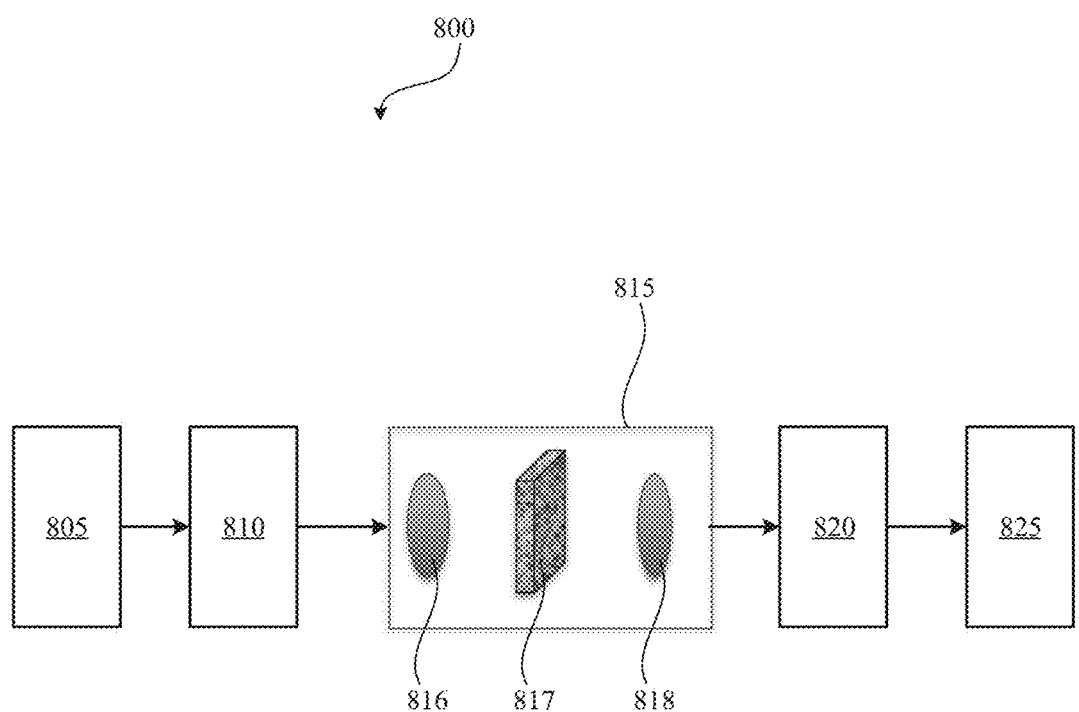
FIG. 8 illustrates an active illumination system according to some embodiments.

FIG. 8 illustrates an illumination system 800 according to some embodiments. The light source 805 may illuminate a scene 810 with one or more projection light patterns (see, for example, the light patterns shown in FIGS. 9A-9G). The scene 810 may include one or more objects and/or samples.

An optical system 815 may direct the light from the scene 810 through one or more optical elements 816, 818 and/or a mask 817 to a detector array 820. The detector array 820 may be coupled with a processor 825 (e.g., computer, controller, etc.) to produce 3D images and/or range maps. The mask 817 may include any phase mask described in this document.

The light source 805 may illuminate the scene 810 with any number of projection patterns. These projection patterns may be produced, for example, using any number of optical elements, masks, and/or filters.

Figure 9:
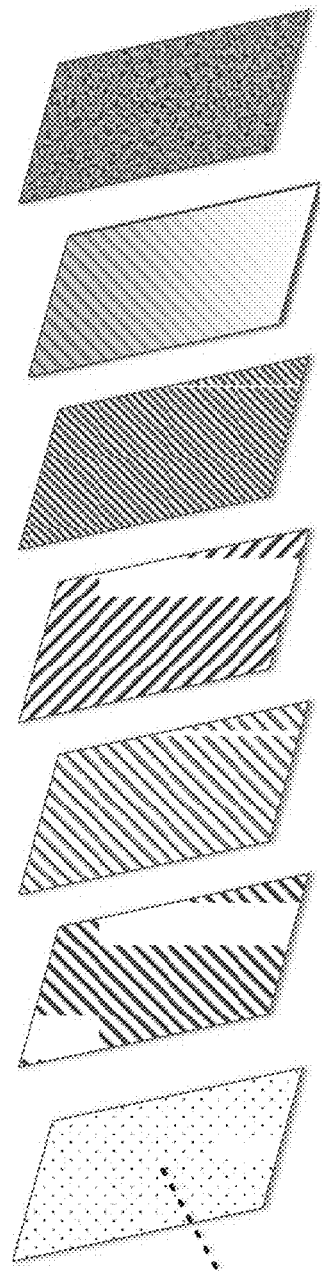
FIGS. 9A-9G illustrate a plurality of examples of projection patterns according to some embodiments.

FIGS. 9A-9G illustrate a plurality of examples of projection patterns. In some embodiments, a projection pattern may include a spot array, for example, as shown in FIG. 9A. The spot array may, for example, be periodic, aperiodic, quasi-periodic, etc.

In some embodiments, the projection pattern may have a striped or sinusoidal pattern as shown in FIGS. 9B, 9C, 9D, and/or 9E. These projection patterns, for example, may be in different directions, have different colors and/or different spatial frequencies;

In some embodiments, the projection pattern may have a low contrast projection pattern and/or low coherence projection pattern as shown in FIG. 9F.

In some embodiments, the projection pattern may have a random speckle pattern as shown in FIG. 9G.

In some embodiments, the pattern may include a three dimensional pattern or a pattern that various in three dimensions.

In some embodiments, the illumination pattern may be created by passing light from a light source through one or more optical elements that include mirrors, masks, gratings spatial light modulators, etc.

In some embodiments, the projection pattern may include a single spot of various sizes and or shapes (e.g., circular, oval, polygonal, etc.). In some embodiments, the projection pattern may also include any type of 3D projection pattern such as, for example, arrays of lines and/or Bessel-like beams, 3D speckle patterns, and/or curved lines as those generated by so-called accelerating beams. Any number of combinations of projection patterns may also be used. Various other projection patterns may be used.

In some embodiments, the spot pattern may include a sparse set of spots, dynamically changing spots, scanning spots, an array of spots that move independently, etc.

FIG. 10 illustrates another illumination system 1000 according to some embodiments. The active illumination system 1000 a light source 1005 may illuminate a scene 1015. In some embodiments, the light source 1005 may produce light with a spot array pattern. In some embodiments, the spot pattern may be created through a mask 1010 or any other filter. In some embodiments, the mask 1010 may include components described in conjunction with optical system 610. In some embodiments, the spot pattern may include any pattern described in conjunction with FIGS. 9A-9G. The scene 1015 may include one or more objects and/or samples.

Light 1020 from the scene 1015 may be imaged through an optical system that may include one or more lenses, one or more optical elements, one or more masks 1025, and/or a detector array 1030. The light 1020 may include all the spots or a subset of the spots illuminated on the scene 1015. The processor 1035 may be coupled with the detector array 1030 and/or may be configured (e.g., programmed with computer readable medium) to produce a point spread function 1040 for each or a subset of the spots. The shape, orientation, and/or position of the point spread function 1040 may encode the depth of the portion of the scene being illuminated such as, for example, each or a subset of the spots.

In some embodiments, the point spread function 1040 may include one or more spots of light that describe curves in three-dimensional space. In some embodiments, the point spread function 1040 may include a point spread function that may have an extended depth of field.

In some embodiments, the processor 1035 may use algorithms such as, for example, centroiding functions, likelihood functions, Bayesian functions, matching pursuit functions, correlations, and/or convex optimization methods. In some embodiments, the processor may output 3D information and/or depth information of the scene; and/or combine the 3D information and/or depth information of the scene with other data. In some embodiments, the processor may also output 3D images and/or range maps.

The mask 1010 and/or the mask 1025 may include any phase mask described in this document.

The illumination system, light source, mask 1010, optical system, mask 1025, detector array 1030, and/or processor 1035 may be part of a 3D imaging and ranging system and/or be coupled within a housing.

In some embodiments, a total system point spread function may be determined and/or used for image creation, objection localization, ranging estimation, etc. The total system point spread function may be the sum (or product) of the point spread functions of the illumination subsystem, the imaging subsystem, and/or the post processing system. If the system includes other elements, then the point spread function from these elements may be included in the total point spread function. In some embodiments, the total point spread function may be experimentally determined or determined during calibration by, for example, by illuminating a known scene at different three dimensional locations under various illumination conditions and determining the point spread from the detected light.

In some embodiments, light detected at the detector array may pass through a mask on the illumination side, the detection side, or both. In some embodiments, the light may alternately pass through one or both a mask on the illumination side, the detection side.

Figure 11:
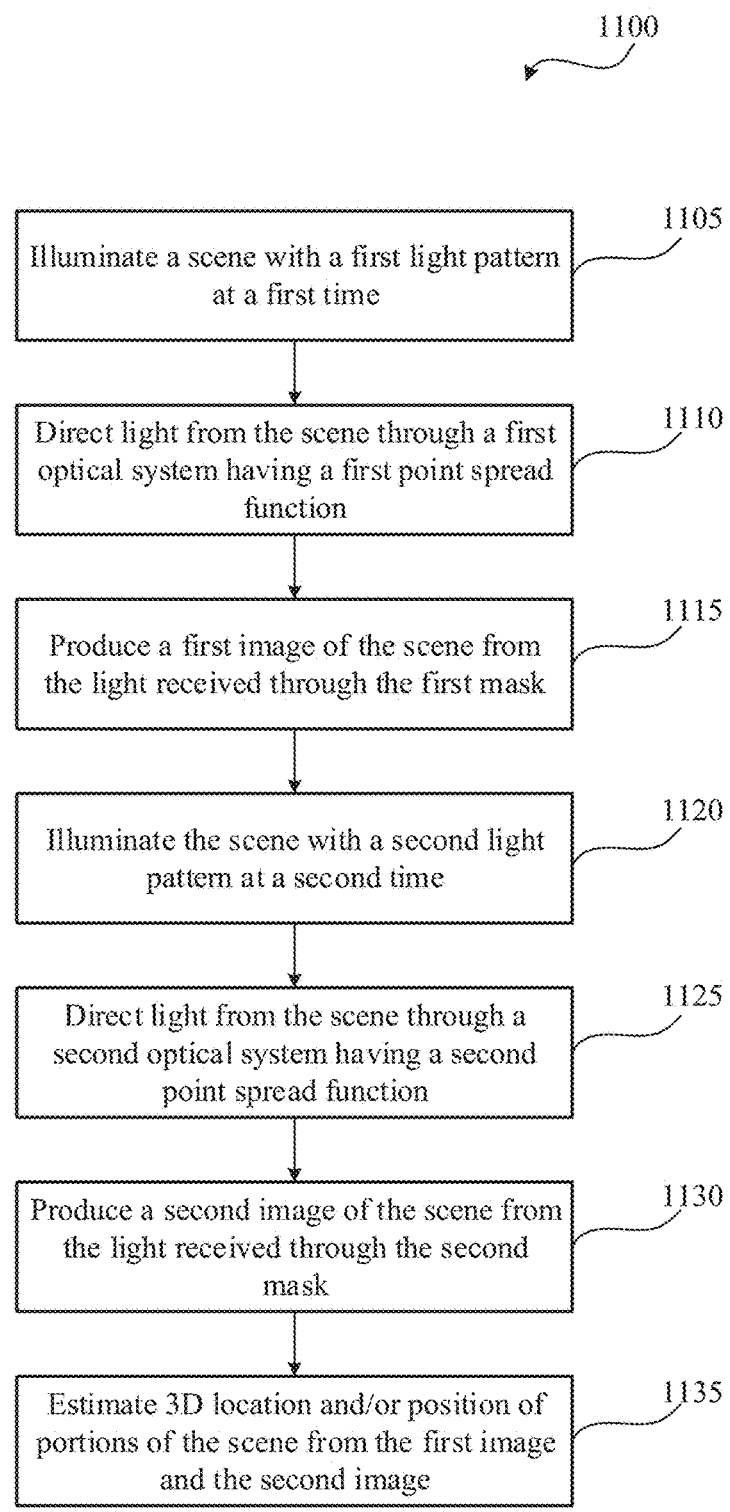
FIG. 11 illustrates an active illumination system according to some embodiments.

FIG. 11 illustrates an active illumination method 1100 according to some embodiments. One or more steps of the method 1100 may be implemented, in some embodiments, by one or more components of the system 600 of FIG. 6, illumination system 800 of FIG. 8, or illumination system 1000 of FIG. 10. Although illustrated as discrete blocks, various blocks may be divided into additional blocks, combined into fewer blocks, or eliminated, depending on the desired implementation.

At block 1105 a scene may be illuminated with a first light pattern in a first time period. The scene, for example, may include the scene 615, the scene 810, and/or the scene 1015. The first light pattern may include, for example, a light pattern shown in FIGS. 9A-9G or any other light pattern described in this document. In some embodiments, the first light pattern may be generated with an active illumination device.

At block 1110, in the first time period, light from the scene may be directed through a first optical system having a first point spread function. The first optical system, for example, may include the optical system 815. The first optical system, for example, may include one or more masks such as, for example, mask 1025 or mask 817 or any other mask described in this document. The first point spread function, for example, may include any point spread function described in this document.

At block 1115 the light from the scene after being illuminated with the first light pattern and/or after being passed through the first optical system may be detected at a light detector and a first image may be created.

For example, if the first mask generates a double helix point spread function, then the first image may include an image or portions of an image that rotates with a rotation angle that varies as a function of axial position. Alternatively or additionally, the point spread function may manifest as a pair of intense lobes in the first image that separate or rotate as the object moves axially. In some embodiment, the size of the point spread function may encode depth information. In some embodiments, the changing shape of the point spread function may encode depth information. For example, a cylindrical lens acting as the phase mask may encode an astigmatic point spread function.

At block 1120 the scene may be illuminated with a second light pattern at a second time period. The second light pattern may include, for example, a light pattern shown in FIGS. 9A-9G or any other light pattern described in this document. The first light pattern and the second light pattern may be from the same or different light sources and/or may comprise the same or different light patterns. In some embodiments, the second light pattern may be generated with an active illumination device.

At block 1125, during the second time period, light from the scene may be directed through a second optical system having a second point spread function. The second optical system, for example, may include the optical system 815. The second optical system, for example, may include one or more masks such as, for example, mask 1025 or mask 817 or any other mask described in this document. The second point spread function, for example, may include any point spread function described in this document.

In some embodiments, the first optical system and the second optical system may include the same optical system. In some embodiments, the first optical system and the second optical system may include different optical systems. In some embodiments, the first point spread function and the second point spread function may include the same point spread function. In some embodiments, the first point spread function and the second point spread function may include different point spread functions.

At block 1120 the light from the scene after being illuminated with the second light pattern and/or after being passed through the second optical system may be detected at a light detector and a second image may be created.

For example, if the second mask generates a double helix point spread function, then the second image may include an image or portions of an image that rotates with a rotation angle that varies as a function of axial position. Alternatively or additionally, the point spread function may manifest as a pair of intense lobes in the second image that separate or rotate as the object moves axially. In some embodiment, the size of the point spread function may encode depth information. In some embodiments, the changing shape of the point spread function may encode depth information. For example, a cylindrical lens acting as the phase mask may encode an astigmatic point spread function.

At block 1135 the 3D location and/or position of portions of the scene may be estimated based on light detected at the detector in the first time period and light detected at the detector in the second time period. In some embodiments, the method 1100 may include illuminating the scene with additional illumination patterns and/or additional optical systems with additional point spread functions (or masks) may be used during additional time periods.

In some embodiments, the detected light may produce a plurality of spots with one or more intensity lobes. In some embodiments, the angular rotation of one or more lobes may be used at least in part to determine the three-dimensional range or location of portions of the scene.

One or more optical systems that include one or more phase masks (e.g., any phase mask described in this document) may direct light from the scene to one or more detector arrays to create a one or more image frames of the scene such as, for example, with a point spread function. A processor may then use the data from the one or more image frames to estimate 3D location of data and/or 3D shapes of the scene.

Figure 12:
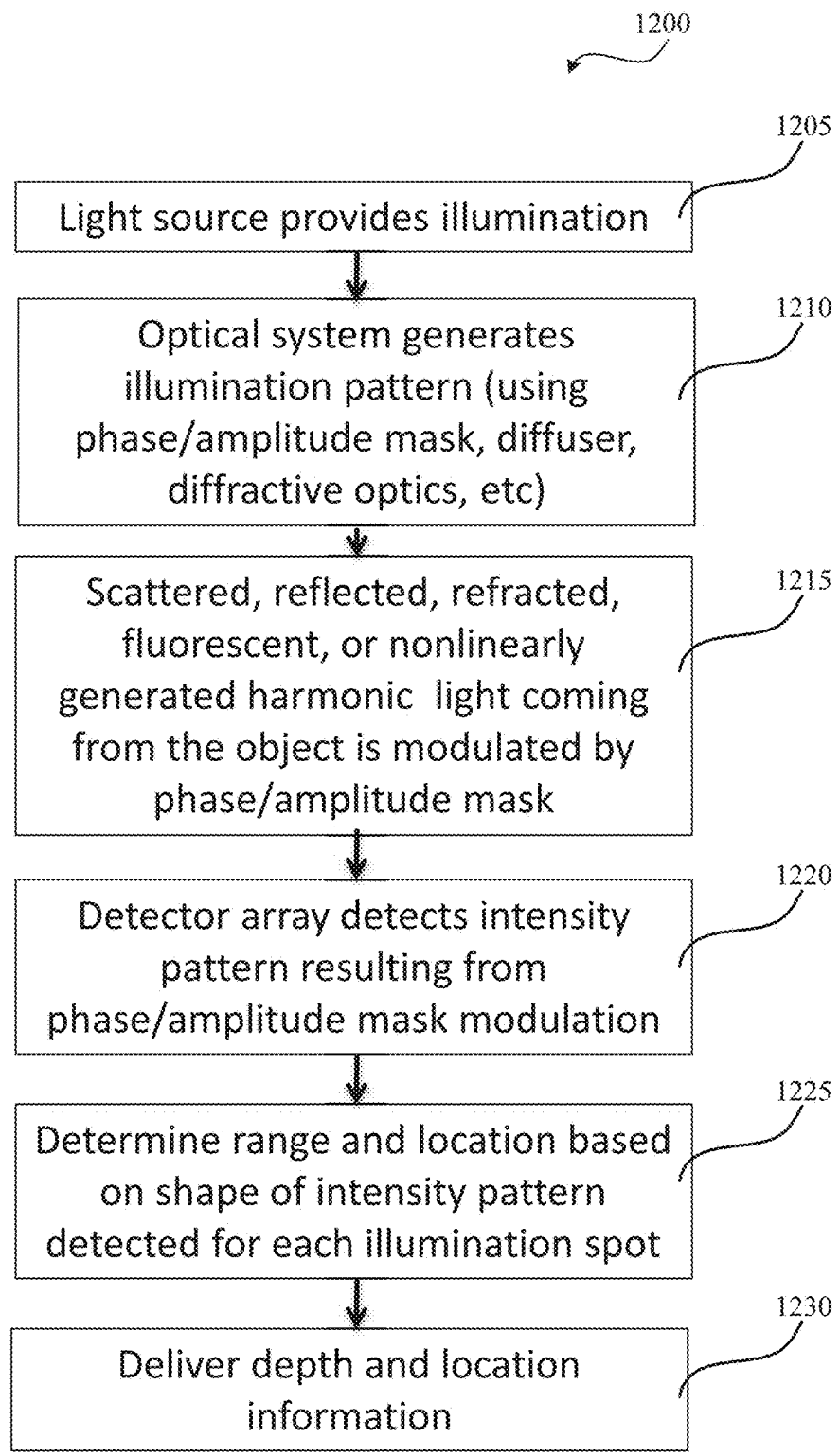
FIG. 12 illustrates an example method for deriving either or both depth and location information from a scene according to some embodiments.

FIG. 12 illustrates an example method 1200 for deriving either or both depth and location information from a scene according to some embodiments. At block 1205, the method begins by illuminating a scene with a light source. Any type of light source may be used.

At block 1210, an illumination pattern may be generated. The illumination pattern, for example, may be generated using an optical system with an active illumination device such as, for example, a phase/amplitude mask, a diffuser, diffractive optics, etc. In some embodiments, the illumination pattern may include a plurality of spots.

At block 1215, light from the scene may be scattered, emitted, reflected, refracted, or some combination thereof from all or a portion of the scene. The light from the scene may also be light that is fluorescing light from portions of the scene. The light from the scene may also be nonlinearly generated harmonic light. The light from the scene may modulated by a phase or amplitude mask.

At block 1220, the light from scene may be detected at the detector array. In some embodiments, the intensity pattern resulting from phase/amplitude mask modulation may be detected.

At block 1225, the range, the location, or some combination thereof may be determined based on the shape, pattern, intensity, angular rotation, or some combination thereof of the light detected at the detector array. In some embodiments, the light may produce a plurality of spots with one or more intensity lobes. In some embodiments, the angular rotation of one or more lobes may be used at least in part to determine the three-dimensional range or location of portions of the scene.

At block 1230, the depth, location, or some combination thereof may be output. The output may include an output to another device, to another processing module, another software module, to storage, or some combination thereof.

Figure 13:
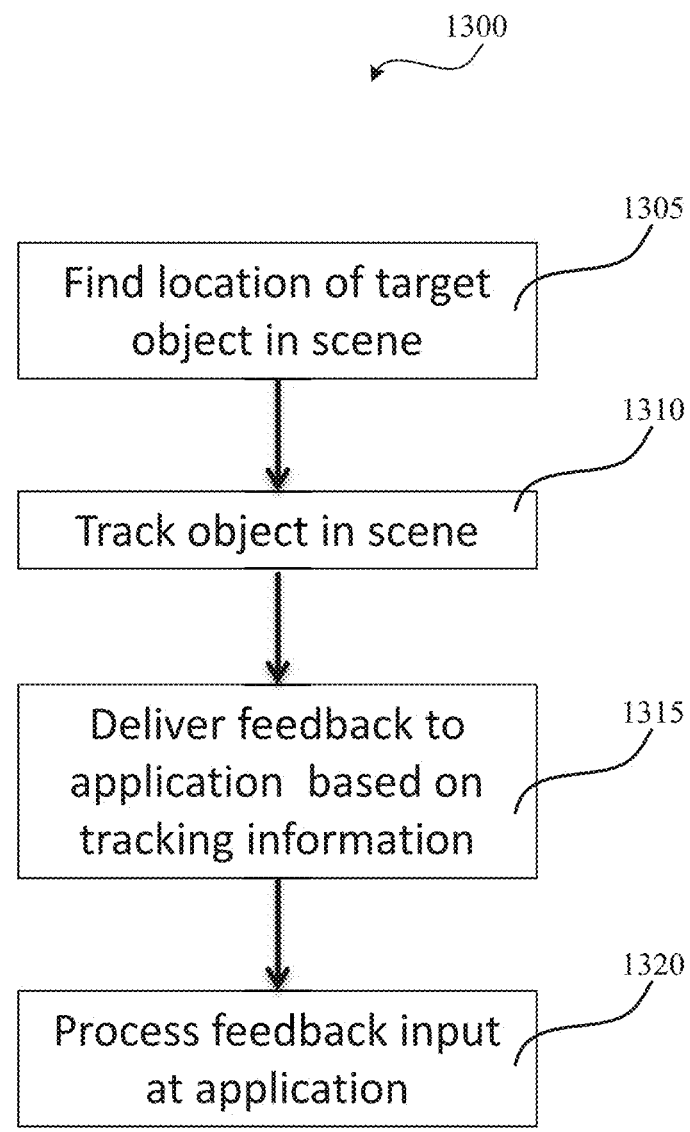
FIG. 13 illustrates an example method for tracking an object within a scene according to some embodiments.

FIG. 13 illustrates an example method 1300 for tracking an object within a scene according to some embodiments. At block 1305 the location of an object can be found within a scene using, for example, processor 1035 and/or processor 825 and/or method 1100 or method 1200. At block 1310, the object may be tracked within the scene. For example, the object may be tracked by determining or estimating the object or portions of the object within the scene over time.

Blocks 1315 and/or 1320 may be implemented using the various embodiments described in this document. At block 1315, feedback that is based on the tracking of the object may be provided to another application, module, process, or some combination thereof. At block 1320, the feedback may be processed at the other application.

The term "substantially" means within 5% or 10% of the value referred to or within manufacturing tolerances.

Various embodiments are disclosed. The various embodiments may be partially or completely combined to produce other embodiments.

Numerous specific details are set forth in this document to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed in this document are not limited to any particular hardware architecture or configuration. A computing device can include any suitable arrangement of components that provides a result conditioned on one or more inputs. Suitable computing devices include a multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in this document in software to be used in programming or configuring a computing device.

Embodiments of the methods disclosed in this document may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" in this document is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included in this document are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

That which is claimed:

1. An imaging system, comprising:
   a pulsed laser;
   an optical system configured to direct first light from the pulsed laser into a pattern that illuminates a scene;
   a mask that generates a point spread function from second light from the scene that varies based on depth within the scene, wherein the second light from the scene comprises light provided by the scene responsive to illumination by the first light;
   a detector array disposed to receive the second light from the scene through the mask and produce an image of the scene, wherein the second light received at the detector array comprises nonlinearly generated harmonic light or multi-photon fluorescence; and
   at least one processor communicatively coupled with the detector and configured to estimate a depth of one or more objects within the scene from the image of the scene.

2. The imaging system according to claim 1, further comprising determining a location of the one or more objects within the scene.

3. The imaging system according to claim 1, wherein the imaging system point spread function is optimized to minimize the Cramer Rao lower bound or to maximize the Fisher information with respect to a given parameter such as position localization.

4. The imaging system according to claim 1, wherein the pattern includes a pattern selected from the list consisting of a spot array pattern, a single spot, a striped pattern, a sinusoidal pattern, a pattern of a sparse set of spots, dynamically changing spot pattern, a scanning spot pattern, a pattern of spots that move independently, and a speckle pattern.

5. The imaging system according to claim 1, wherein the processor estimates the depth of the one or more objects based on the representation of the point spread function in the image of the scene.

6. The imaging system according to claim 1, wherein the point spread function comprises a double helix point spread function.

7. The imaging system according to claim 1, wherein the mask includes an optical element selected from the list consisting of an optical element with an extended depth of field, a cubic phase mask, a double helix point spread function mask, diffractive optical element, a grating, a Dammann grating, a diffuser, a phase mask, a hologram, an amplitude mask, a spatial light modulator, and a prism array.

8. The imaging system according to claim 1, wherein the optical system comprises one or more components selected from the group consisting of an active illumination element, phase mask, lens, diffractive optical element, grating, Dammann grating, diffuser, phase mask, hologram, amplitude mask, spatial light modulator, and prism array.

9. A method comprising:
   illuminating a scene with first light having a pattern;
   directing second light from the scene through an optical system that includes a mask that generates a point spread function that varies based on depth within the scene, wherein the second light comprises light provided by the scene responsive to illumination by the first light;
   producing an image of the scene from the second light that passes through the mask using a light detector, the second light received at the light detector and comprising nonlinearly generated harmonic light or multi-photon fluorescence; and
   estimating a depth of one or more objects within the scene from the image of the scene.

10. The method according to claim 9, wherein the pattern includes a pattern selected from the list consisting of a spot array pattern, a striped pattern, a sinusoidal pattern, a pattern of a sparse set of spots, dynamically changing spot pattern, a scanning spot pattern, a pattern of spots that move independently, and a speckle pattern.

11. The method according to claim 9, wherein the depth of the one or more objects is estimated based on the representation of the point spread function in the image of the scene.

12. The method according to claim 9, wherein the point spread function comprises a double helix point spread function.

13. The method according to claim 9, wherein the mask includes an optical element selected from the list consisting of an optical element with an extended depth of field, a cubic phase mask, a double helix point spread function mask, diffractive optical element, a grating, a Dammann grating, a diffuser, a phase mask, a hologram, an amplitude mask, a spatial light modulator, and a prism array.

14. A method comprising:
illuminating a scene with first light that has a first light pattern;
generating a first image of the scene from second light from the scene that passes through a first mask using a light detector, wherein the second light comprises light provided by the scene responsive to illumination by the first light, wherein the second light received at the light detector further comprises nonlinearly generated harmonic light or multi-photon fluorescence; and
illuminating the scene with third light that has a second light pattern;
generating a second image of the scene from fourth light from the scene that passes through a second mask using the light detector, wherein the fourth light comprises light provided by the scene responsive to illumination by the third light; and
estimating a depth of one or more objects within the scene from the first image of the scene and the second image of the scene.

15. The method according to claim 14, wherein the first mask and the second mask are the same mask.

16. The method according to claim 14, further comprising generating a three-dimensional image of the scene from the first image of the scene and the second image of the scene.

17. The method according to claim 14, wherein:
the first mask generates a first point spread function from the second light from the scene that varies based on depth within the scene; and
the second mask generates a second point spread function from the fourth light from the scene that varies based on depth within the scene.

18. The method according to claim 17, wherein either or both the first point spread function and the second point spread function comprises a point spread function selected from the list consisting of a double helix point spread function, a helical point spread function, an extended depth of field point spread function, and a cubic phase point spread function.

19. The method according to claim 14, wherein the first pattern includes a pattern selected from the list consisting of a spot array pattern, a striped pattern, a sinusoidal pattern, and a speckle pattern; and wherein the second pattern includes a pattern selected from the list consisting of a spot array pattern, a striped pattern, a sinusoidal pattern, and a speckle pattern.

20. The method according to claim 14, wherein either or both the first mask and the second mask include an optical element selected from the list consisting of an optical element with an extended depth of field, a cubic phase mask, a double helix point spread function mask, diffractive optical element, a grating, a Dammann grating, a diffuser, a phase mask, a hologram, an amplitude mask, a spatial light modulator, and a prism array.

* * * * *